United States Patent Office 3,122,590
Patented Feb. 25, 1964

3,122,590
PREPARATION OF THE GAMMA ISOMER OF 4,5,6,7,8,8 - HEXACHLORO - 3a,4,7,7a - TETRAHYDRO-4,7-METHANOINDENE
Arthur W. Carlson, Chicago, Ill., assignor to Velsicol Chemical Corporation, Chicago, Ill., a corporation of Illinois
No Drawing. Filed Feb. 10, 1961, Ser. No. 88,299
13 Claims. (Cl. 260—648)

This invention relates to a process for the preparation of a pesticidal composition of matter. More specifically, this invention relates to a novel process for the preparation of the herbicidally toxic gamma-isomer of 4,5,6,7,8,8-hexachloro - 3a,4,7,7a - tetrahydro - 4,7 - methanoindene, which indene compound will be referred to hereinafter as compound A for brevity.

Compound A is a crystalline compound which can be obtained readily in good yield by the equimolecular, Diels-Alder addition of cyclopentadiene and hexachlorocyclopentadiene. It has been found that while compound A itself is not toxic to noxious weeds such as crabgrass, certain isomers of compound A have marked toxicity to crabgrass.

For example, one isomer of compound A which has a melting point in the pure state of 146.3° to 147° C. and which has been designated as beta-A, has marked toxicity to crabgrass. Another isomer of compound A which has a melting point in the pure state of 102° to 103° C. and which has been designated as gamma-A, is also very toxic to crabgrass. Both of these isomers have the same molecular formula, $C_{10}H_6Cl_6$, as compound A. But the physical properties of the isomers are distinguishingly different from compound A, which for example has a melting point in the pure state of 210° to 211° C. (under nitrogen). These isomers and compound A itself also have distinctive infrared spectra, ultraviolet spectra, and gas chromatograms.

For example, compound A has an infrared absorption spectrum with strong bands at 13.5 and 14.8 microns, medium bands at 10.0, 11.0, 11.1, and 14.025 microns, and weak bands at 10.5, 12.025, 12.325, and 13.225 microns. Alpha-A has an infrared absorption spectrum with strong bands at 10.925, 12.85, and 14.55 microns and medium bands at 10.1 and 13.825 microns. Beta-A has an infrared absorption spectrum with strong bands at 10.4, 10.75, and 12.75 microns and medium bands at 10.075, 11.65, 13.7–13.8, and 14.4 microns. Gamma-A has an infrared absorption spectrum with strong bands at 11.65, 13.125, and 14.35 microns, medium bands at 10.19, 11.325, and 13.95 microns, and a weak band at 13.65 microns. In these spectra, the strong bands are those at less than 40% transmission, medium bands are those at 40–60% transmission, and weak bands are those at more than 60% transmission.

Compound A can be converted to its herbicidally toxic isomers by heating it in the presence of free-radical-initiating catalysts. The organic peroxy compounds, for example, have been found to be very effective catalysts and can be used alone or mixed with other free-radical-initiating catalysts such as the inorganic peroxides, alkali per-salts, chlorine, sulfuryl chloride, hydrazine compounds, and the like. The heating is carried out at a temperature below about 200° C. It is also preferred that when mixtures of free-radical-initiating catalysts are used, at least one component of the mixture be an organic peroxy compound. It is preferred that catalytic amounts of the catalyst or catalyst mixture be used, and this amount will be less than about 25% by weight of the compound A.

However, while this process does convert compound A in good yield to its herbicidally toxic beta- and gamma-isomers along with some unreacted compound A and other by-products, the reaction also gives significant amounts of another isomer of compound A. This isomer, which has a melting point in the pure state of 193° to 194.5° C. and has been designated as alpha-A, has not shown any significant toxicity to crabgrass. This alpha isomer is also distinguished by its infrared spectrum, which shows identifying absorption bands at 10.1, 10.925, 12.85, 13.825, and 14.55 microns. The alpha-A, which may be present to the extent of as much as 25% by weight of the isomerization reaction product, is therefore a disadvantage, since it reduces the total toxicity to crabgrass of the isomerized product.

It is therefore an object of this invention to provide a simple method for the removal of alpha-A from mixtures comprising it and herbicidally toxic isomers of A.

It is a further object of this invention to provide a new and novel method for the conversion of herbicidally non-toxic alpha-A to herbicidally toxic gamma-A in good yield.

It is another object of this invention to provide mixtures of isomers of compound A which are enriched in its herbicidally toxic isomers.

It has now been found that alpha-A can be separated by differential solubility from isomerized mixtures of compound A, and it has further been found that alpha-A can be converted to gamma-A by heating it at relatively high temperatures or by contacting it at lower temperatures with catalysts.

Ordinarily, the separation of chemical isomers is a difficult process, since elaborate crystallization, fractional distillation, chromatographic or other techniques must be employed to separate the isomers. It was therefore surprising and unexpected to discover that alpha-A is very insoluble in a wide variety of organic solvents while its beta and gamma-isomers, compound A itself, and other products obtained in the free-radical-catalyzed isomerization of compound A are readily soluble in these same solvents, and that this differential solubility can be used as the basis for a simple, rapid, and economical process for the separation of alpha-A.

The separation process comprises treating crude reaction mixtures of alpha-A, other isomers of compound A, compound A itself, as well as other by-products arising in the process of isomerizing compound A, with a substance which is a poor solvent for alpha-A but a good solvent for the other materials named. The exact substance to be used is not critical, since alpha-A has been found to be quite insoluble in most of the common laboratory solvents with the exception of hot acetone and hot carbon tetrachloride. It is preferred, however, that the substance be a common organic laboratory solvent which is liquid at normal room temperature. This will include such typical solvents as pentane, hexane, benzene, toluene, heptane, xylene, chloroform, dichlorobenzene, petroleum ether, trichlorobenzene, and the like.

Although the separation process can be carried out at any temperature at which alpha-A will be insoluble while the other components are soluble in the substance chosen, it is preferred for convenience that the process be carried out at normal room temperature or below. Ordinarily, the alpha-A separates from the mixture as a solid and can simply be filtered off and dried. The filtrate with most of the alpha-A thus removed can now be stripped and the residue used in pesticidal formulations. However, it is desirable to isomerize the isolated alpha-A according to the process of this invention and to add the resulting gamma-A to the above residue to enrich its content of herbicidally active isomers of compound A.

The process of this invention for the isomerization of alpha-A to gamma-A comprises heating alpha-A alone or contacting it with suitable catalysts. Alpha-A, which has a sharp melting point at 193° to 194.5° C., is thus quite stable when heated at moderate temperatures. However, it has been found that when alpha-A is heated at temperatures of about 200° C. or above, it undergoes isomerization to gamma-A. The exact temperature above 200° C. at which this isomerization process can be carried out is not critical, but temperatures between about 200° and 350° C. are preferred for convenience. The conversion of alpha-A to gamma-A is quite rapid at these temperatures, requiring for example, only about ten minutes at 250°–270°C. Although the isomerization can be carried out satisfactorily with alpha-A alone, it is often convenient to use a suitable inert solvent or diluent to obtain more uniform heating of the compound. Further, alpha-A tends to sublime at these temperatures, and a refluxing solvent is valuable to wash the solid back into the reaction mixture. Any of the solvents discussed above in the separation process can be used, provided proper reflux apparatus is provided at the relatively high temperatures required. The alpha-A, of course, will be largely insoluble in these substances, and the multiphase system should therefore be well stirred to maintain good distribution, or a surface active agent of the type known in the art can be used to suspend the alpha-A in the solvent. As the isomerization progresses, the gamma-A formed will frequently go into solution in many of the solvents.

It has also been found that relatively low temperatures can be used to isomerize alpha-A to gamma-A, provided a suitable catalyst is used. Such catalysts are substances which have been defined as Lewis acid catalysts. These comprise, in addition to the conventional acids, such substances as metallic ions, covalent halides, nonmetallic oxides, and other molecules which are capable of accepting electron pairs (electron-deficient molecules). Typical examples of such Lewis acid catalysts are boron trifluoride, sulfur trioxide, aluminum chloride, ferric chloride, zinc chloride, titanium tetrachloride, anhydrous hydrogen fluoride, as well as such conventional acids as sulfuric acid, hydrochloric acid, acetic acid, and p-toluenesulfonic acid. The exact amount of catalyst to be used is not critical, but it is preferred to use from about one to about ten percent by weight of catalyst based on the weight of alpha-A.

When such catalysts are used, considerably lower temperatures can generally be used than are necessary when the isomerization is carried out by heating alpha-A without catalyst. However, the process of this invention is still fully operable if catalysts are used at the elevated temperatures cited above. It is preferred to use temperatures in the range from about normal room temperature to about 200° C. when the process is carried out with catalysts. When the catalysts are used, it is particularly convenient to use suitable solvents or diluents as discussed above.

The course of the isomerization can be followed readily by infrared scans of samples of the reaction mixture. When the desired degree of isomerization has been obtained, any solvents which have been used can be stripped to give a residue which can be formulated directly for pesticidal use. Alternately, the gamma-A so obtained can be added to isomerized mixtures of compound A to enrich their content of the herbicidally active isomers. If desired, the gamma-A can also be isolated in pure form by recrystallization, chromatography, fractional distillation, or other techniques known to the art. While the isomerization of this invention is ordinarily carried out at atmospheric pressure, it can also be carried out at sub- or superatmospheric pressures.

The following examples illustrate the manner in which the process of this invention can be carried out on starting materials from various sources. All temperatures are in degrees centigrade.

EXAMPLE 1

*Isomerization of Compound A With Peroxide Catalyst*

Compound A, M.P. 210°–211° (under nitrogen), was prepared in nearly quantitative yield by the Diels-Alder addition of equimolecular quantities of cyclopentadiene and hexachlorocyclopentadiene.

Compound A (50 parts by weight) was dissolved in 195 parts by weight of carbon tetrachloride in a reaction vessel fitted with stirring apparatus, internal thermometer, and provision for reflux. A solution of 5 parts of benzoyl peroxide in 150 parts of carbon tetrachloride was then added at 80° over a period of 6 hours. The reaction mixture was then stirred and refluxed for 4 hours and cooled. The solvent from about one liter of this reaction product was stripped for about 2 hours at 80–100° to give 34.7 g. of an oily residue which was found by infrared spectrum analysis to contain by weight about 22% alpha-A, 12% beta-A, 28% gamma-A, 8% unchanged A, and 30% other materials.

EXAMPLE 2

*Isomerization of Compound A With a Mixed Catalyst*

Into a one-liter, round-bottomed flask fitted with a heating mantle, reflux condenser, and dropping funnel was placed a 20% solution by weight of compound A (100 g.) in carbon tetrachloride. Benzoyl peroxide (3.5 g.) was added, and the solution was stirred and heated at reflux temperature while sulfuryl chloride (10 g.) was added dropwise over a 3-hr. period. The mixture was then refluxed for an additional 4 hrs., after which the solvent was stripped in vacuo. The residue was found by infrared spectrum analysis and gas chromatographic analysis to contain by weight approximately 18% alpha-A, 15% beta-A, 27% gamma-A, 3% unreacted A, and 37% other materials.

EXAMPLE 3

*Separation of Alpha-A With Pentane*

The 34.7 g. of oily residue obtained as the reaction product in Example 1 was treated with 200 ml. of normal pentane at room temperature. The precipitated solid was filtered, washed with a little pentane, and dried to give 5.8 g. of alpha-A. This represents a 76% recovery of the alpha-A found by infrared analysis to be present in the isomerization product. The alpha-A was recrystallized from acetone and filtered and dried to give white crystals, M.P. 193–195°.

EXAMPLE 4

*Isomerization of Alpha-A Without Catalyst*

Alpha-A (20.0 g.) having a melting point of 190–193° was placed in a 100-ml., tall-form beaker and heated on a hot plate to a temperature of 250°. The molten material was stirred and heated for 5 minutes at 250°, then for 5 minutes at 270°. An infrared scan of the product showed that only a small amount of alpha-A remained and that the conversion to gamma-A was nearly complete.

During the heating process, a small amount of solid had sublimed on the sides of the beaker and was discarded. The solid remaining in the beaker after cooling was dissolved in 75 ml. of hot hexane, and the solution was cooled to ice temperature. The precipitated solid was filtered, washed with 30 ml. pentane, and dried to give 15.5 g. of essentially pure powdery gamma-A.

EXAMPLE 5

*Isomerization of Alpha-A With Ferric Chloride*

Alpha-A (0.10 g.) was placed in a 10-inch test tube made from 8-mm. glass tubing. Nitromethane (1 ml.) was added, and the mixture was heated to gentle reflux in an oil bath maintained at 110°. A solution of 0.5 mg. ferric chloride in 0.1 ml. nitromethane was added, and the mixture was heated at 110° for 15 minutes. Another 0.1 ml. of FeCl$_3$ solution was then added, and the heating was continued for an additional 15 minutes. The mixture in the tube was cooled, dissolved in carbon disulfide, shaken with potassium carbonate, and filtered. The solvent was then stripped (finally under high vacuum) to give a residue which was shown by infrared analysis to contain about 10% gamma-A. Samples of compound A, beta-A, and gamma-A subjected to the same reaction did not undergo any change.

EXAMPLE 6

*Isomerization of Alpha-A at High Temperature Without Catalyst*

Alpha-A (20.0 g.) is placed in a 100 ml. flask fitted with an efficient mechanical stirrer and an internal thermometer. The flask is heated rapidly, the stirrer being started as soon as the solid becomes a slush. When the temperature reaches 350°, this temperature is maintained for 5 minutes while the mass in the flask is stirred vigorously. When cooled, the residue in the flash will contain gamma-A in good yield. It can be used as such in pesticidal formulation, or it can be purified by recrystallization from a solvent such as hexane.

EXAMPLE 7

*Separation of Alpha-A and Isomerization Without Catalyst*

The residue remaining after stripping the solvent from the product of Example 2 is treated with 200 ml. of hexane at room temperature. The solid which separates is filtered, pressed dry, and placed in a 100-ml., round-bottom flask fitted with a mechanical stirrer, reflux condenser, and internal thermometer. Xylene (20 cc.) is added, and the mixture is stirred and heated at 200° for one-half hour. If an infrared scan of a sample of the mixture reveals that substantial conversion to gamma-A has not yet taken place, heating is continued until the desired degree of conversion is obtained. When the xylene is stripped from the contents of the flask, the residue can be formulated for pesticidal use, or it can be added to the hexane solution remaining after filtration of the alpha-A. The hexane solution will thus be enriched in its content of herbicidally toxic isomers of compound A.

EXAMPLE 8

*Isomerization of Alpha-A with Catalyst at Low Temperature*

Alpha-A (20.0 g.) is placed with 250 cc. of benzene and 2.0 g. of anhydrous aluminum chloride a 500-cc. round-bottomed flask fitted with a mechanical stirrer and an air condenser (calcium chloride tube seal). The mixture is stirred vigorously at room temperature for 5 hours, after which the solvent is stripped in vacuo. The residue is treated with 75 ml. of hot hexane, filtered, and allowed to cool. The precipitated solid can then be filtered off, washed with a little pentane, and dried to give gamma-A in good yield.

EXAMPLE 9

*Isomerization of Alpha-A with Catalyst at High Temperature*

Alpha-A (20.0 g.) is placed with 250 cc. of n-dodecane and 0.20 g. of anhydrous ferric chloride in a 500 cc., round-bottomed flask fitted with a mechanical stirrer, reflux condenser, and internal thermometer. The mixture is stirred and heated for one hour at a temperature of 200°, after which the solvent is stripped in vacuo. The residue contains gamma-A and can be formulated directly for pesticidal use or can be added to isomerized mixtures of compound A to enrich their content of herbicidally active isomers.

I claim:

1. The method for the preparation of the gamma isomer of 4,5,6,7,8,8-hexachloro-3a,4,7,7a-tetrahydro - 4,7 - methanoindene, said indene compound having a melting point of about 210–211° C. under nitrogen, which comprises heating the alpha isomer of said indene compound at a temperature of at least about 200° C.

2. The method of claim 1, wherein the heating is carried out in an inert solvent.

3. The method of claim 1, wherein the heating is carried out at a temperature of from about 200° to about 350° C.

4. The method for the preparation of the gamma isomer of 4,5,6,7,8,8-hexachloro-3a,4,7,7a-tetrahydro-4,7 - methanoindene, said indene compound having a melting point of about 210°–211° C. under nitrogen, which comprises separating the alpha isomer of said indene compound from a mixture of isomers of said indene compound by treating said mixture with solvent selected from the group consisting of pentane, hexane, benzene, toluene, heptane, xylene, chloroform, dichlorobenzene, petroleum ether, and trichlorobenzene, recovering the alpha isomer as the insoluble fraction, and heating the alpha isomer at a temperature of from about 200° to about 350° C.

5. The method for the preparation of the gamma isomer og 4,5,6,7,8,8-hexachloro-3a,4,7,7a-tetrahydro-4,7 - methanoindene, said indene compound having a melting point of about 210°–211° C. under nitrogen, which comprises separating the alpha isomer of said indene compound from a mixture of isomers of said indene compound by treating said mixture with solvent selected from the group consisting of pentane, hexane, benzene, toluene, heptane, xylene, chloroform, dichlorobenzene, petroleum ether, and trichlorobenzene; recovering the alpha isomer as the insoluble fraction; and contacting the alpha isomer in an inert solvent with from about one to about ten percent by weight, based on the weight of the alpha isomer, of a Lewis acid catalyst at a temperature of from about normal room temperature to about 200° C.

6. The method which comprises heating 4,5,6,7,8,8-hexachloro-3a,4,7,7a-tetrahydro-4,7 - methanoindene having a melting point of about 210°–211° C. under nitrogen in the presence of a catalytic amount of organic peroxy compound at a temperature below about 200° C.; separating the alpha isomer of said indene compound from the resulting reaction mixture by treating said mixture with solvent selected from the group consisting of pentane, hexane, benzene, toluene, heptane, xylene, chloroform, dichlorobenzene, petroleum ether, and trichlorobenzene; recovering the alpha isomer as the insoluble fraction; and heating the alpha isomer at a temperature of from about 200° to about 350° C. to convert said alpha isomer to the gamma isomer of said indene compound.

7. The method which comprises heating 4,5,6,7,8,8-hexachloro-3a,4,7,7a - methanoindene having a melting point of about 210°–211° C. under nitrogen in the presence of a catalytic amount of organic peroxy compound at a temperature below about 200° C.; separating the alpha isomer of said indene compound from the resulting reaction mixture by solvent separation with a solvent selected from the group consisting of pentane, hexane, benzene, toluene, heptane, xylene, chloroform, dichlorobenzene, petroleum ether, and trichlorobenzene and recovering the alpha isomer as the insoluble fraction; and contacting the alpha isomer in an inert solvent with from about one to about ten percent by weight, based on the weight of alpha isomer, of a Lewis acid catalyst at a temperature of from about normal room temperature to about 200° C. to convert said alpha isomer to the gamma isomer of said indene compound.

8. The method which comprises heating 4,5,6,7,8,8-hexachloro-3a,4,7,7a-tetrahydro-4,7 - methanoindene having a melting point of about 210°–211° C. under nitrogen in the presence of a catalytic amount of free-radical-initiating catalyst at a temperature below about 200° C.; separating the alpha isomer of said indene compound from the resulting reaction mixture by treating said mixture with solvent selected from the group consisting of pentane, hexane, benzene, toluene, heptane, xylene, chloroform, dichlorobenzene, petroleum ether, and trichlorobenzene and recovering the alpha isomer as the insoluble fraction; and heating the alpha isomer at a temperature of from about 200° to about 350° C. to convert said alpha isomer to the gamma isomer of said indene compound.

9. The method which comprises heating 4,5,6,7,8,8-hexachloro-3a,4,7,7a-tetrahydro-4,7 - methanoindene having a melting point of about 210°–211° C. under nitrogen in the presence of a catalytic amount of free-radical-initiating catalyst at a temperature below about 200° C.; separating the alpha isomer of said indene compound from the resulting reaction mixture by treating said mixture with solvent selected from the group consisting of pentane, hexane, benzene, toluene, heptane, xylene, chloroform, dichlorobenzene, petroleum ether, and trichlorobenzene and recovering the alpha isomer as the insoluble fraction; and contacting the alpha isomer in an inert solvent with from about one to about ten percent by weight, based on the weight of alpha isomer, of a Lewis acid catalyst at a temperature of from about normal room temperature to about 200° C. to convert said alpha isomer to the gamma isomer of said indene compound.

10. A method for the preparation of mixtures of isomers of 4,5,6,7,8,8 - hexachloro-3a,4,7,7a-tetrahydro-4,7-methanoindene, said indene compound having a melting point of about 210°–211° C. under nitrogen, essentially free of the alpha isomer of said indene compound which comprises separating the alpha isomer from a reaction product comprising isomers of said indene compound by treating said product with solvent selected from the group consisting of pentane, hexane, benzene, toluene, heptane, xylene, chloroform, dichlorobenzene, petroleum ether, and trichlorobenzene and recovering the alpha isomer as the insoluble fraction; heating the alpha isomer at a temperature of from about 200° to about 350° C. to convert said alpha isomer to the gamma isomer of said indene compound; and adding said gamma isomer to the soluble fraction of the reaction product remaining after removal of the alpha isomer.

11. A method for the preparation of mixtures of isomers of 4,5,6,7,8,8-hexachloro-3a,4,7,7a - tetrahydro-4,7-methanoindene, said indene compound having a melting point of about 210°–211° C. under nitrogen, essentially free of the alpha isomer of said indene compound which comprises separating the alpha isomer from a reaction product comprising isomers of said indene compound by treating said product with solvent selected from the group consisting of pentane, hexane, benzene, toluene, heptane, xylene, chloroform, dichlorobenzene, petroleum ether, and trichlorobenzene and recovering the alpha isomer as the insoluble fraction; contacting the alpha isomer in an inert solvent with from about one to about ten percent by weight, based on the weight of alpha isomer, of a Lewis acid catalyst at a temperature of from about normal room temperature to about 200° C. to convert said alpha isomer to the gamma isomer of said indene compound; and adding said gamma isomer to the soluble fraction of the reaction product remaining after removal of the alpha isomer.

12. The method for the preparation of the gamma isomer of 4,5,6,7,8,8-hexachloro - 3a,4,7,7a - tetrahydro-4,7-methanoindene, said indene compound having a melting point of about 210°–211° C. under nitrogen, which comprises contacting the alpha isomer of said indene compound with a Lewis acid catalyst at a temperature of from about normal room temperature to about 350° C.

13. The method for the preparation of the gamma isomer of 4,5,6,7,8,8-hexachloro - 3a,4,7,7a - tetrahydro-4,7-methanoindene, said indene compound having a melting point of about 210°–211° C. under nitrogen, which comprises contacting the alpha isomer of said indene compound in an inert solvent with from about one to about ten percent by weight based on the weight of the alpha isomer of the 4,5,6,7,8,8-hexachloro-3a,4,7,7a-tetrahydro-4,7-methanoindene of a Lewis acid catalyst at a temperature of from about normal room temperature to about 200° C.

References Cited in the file of this patent

Riemschneider: "Monatshefte für Chemie," volume 83 (1952), pages 802–17.